United States Patent [19]

Swedo et al.

[11] Patent Number: 4,919,808

[45] Date of Patent: Apr. 24, 1990

[54] SEMIPERMEABLE MEMBRANE COMPOSITIONS

[75] Inventors: Raymond J. Swedo, Mt. Prospect; Joseph J. Zupancic, Bensenville, both of Ill.

[73] Assignee: Allied-Signal Inc., Morris Township, Morris County, N.J.

[21] Appl. No.: 789,682

[22] Filed: Oct. 21, 1985

[51] Int. Cl.$^5$ .............................................. B01J 13/00
[52] U.S. Cl. ................ 210/490; 210/500.37; 427/245
[58] Field of Search ............... 210/654, 500.38, 490, 210/500.37; 427/246, 245

[56] References Cited

U.S. PATENT DOCUMENTS

| | | | |
|---|---|---|---|
| 3,260,691 | 7/1966 | Lavin et al. | 260/30.2 |
| 3,480,588 | 11/1969 | Lavin et al. | 260/47 |
| 3,567,632 | 3/1971 | Richter et al. | 210/23 |
| 3,600,350 | 8/1971 | Kwolek | 260/32.6 |
| 3,710,945 | 1/1973 | Dismore | 210/321 |
| 3,878,109 | 4/1975 | Ikeda et al. | 210/500 M |
| 3,904,519 | 9/1975 | McKinney, Jr. et al. | 210/23 |
| 3,920,612 | 11/1975 | Stephens | 260/47 CP |
| 3,951,815 | 4/1976 | Wrasidlo | 210/500 M |
| 3,993,625 | 11/1976 | Kurihara et al. | 260/47 CP |
| 4,039,440 | 8/1977 | Cadotte | 210/500.37 X |
| 4,048,144 | 9/1977 | Stephens | 260/47 CP |
| 4,353,802 | 10/1982 | Hara et al. | 210/500.2 X |
| 4,634,531 | 1/1987 | Nakagawa et al. | 210/639 |

OTHER PUBLICATIONS

"Polyamide Membranes" from Reverse Osmosis and Synthetic Membranes by Jourirajan, 1977 pp. 167–210.

*Primary Examiner*—Frank Spear
*Attorney, Agent, or Firm*—Raymond H. Nelson; Harold N. Wells

[57] ABSTRACT

Semipermeable membranes which may be used in a variety of separation processes such as desalination, sugar separation, etc. are prepared by contacting a porous support backing material such as polysulfone with an aqueous solution of a hydrazine compound. The coated support material is then contacted with an organic solution of an aromatic polycarboxylic acid chloride whereby an interfacial polymerized condensation reaction product is formed on the surface of the support. The thus formed composite is then cured at an elevated temperature and recovered.

27 Claims, No Drawings

SEMIPERMEABLE MEMBRANE COMPOSITIONS

BACKGROUND OF THE INVENTION

The separation of various components found in liquids or gases may be effected in a multitude of processes, the techniques for effecting the separation including ultrafiltration or reverse osmosis. A particular example of the latter type of separation involves a desalination process in which water, which is rendered potable or suitable for other purposes, is obtained from sea water, contaminated water, brackish water or brine. This process is of especial value in areas of the world where the water found in the area is brackish or is saline in nature. The desalination of this water is necessary in order to provide large amounts of potable or relatively nonsalty water for industrial, agricultural or home use. The desalination of the water is effected by forcing the water through a reverse osmosis membrane whereby the purified water is passed through the membrane and recovered, while the contaminants or salts do not pass through the membrane, thus, in effect, being rejected by the membrane and recovered as the retentate.

A reverse osmosis membrane, in order to be utilized for such a purpose, must possess certain characteristics applicable to the process. For example, the membrane must have a very high salt rejection coefficient. Another important factor which is present in the use of a reverse osmosis membrane is that said membrane also possess a high flux characteristic, that is, the ability to pass a relatively large amount of water through the membrane at relatively low pressures. If a membrane possesses these desirable characteristics, it will be commercially feasible in its applicability to the desalination process.

Reverse osmosis membranes have been prepared and used from a wide variety of known polymeric materials. While many of these polymeric materials possess the ability of reducing the concentration of a solute to where the salt rejection capability is in excess of 98%, some do not possess the necessary flux rate whereby the volume of water which is required to be produced by the membrane per unit of membrane surface is sufficient for the application of the technology.

As was hereinbefore set forth, many prior U.S. patents describe various membranes which are useful in desalination processes. For example, U.S. Pat. Nos. 3,567,632, 3,600,350, 3,710,945, 3,878,109, 3,904,519, 3,920,612, 3,951,815, 3,993,625 and 4,048,144 illustrate various semipermeable membranes prepared from polyamides. Likewise, U.S. Pat. Nos. 3,260,691 and 3,480,588 disclose coating compositions which are obtained from the condensation products of aromatic primary diamines and aromatic tricarboxylic compounds.

Inasmuch as the semipermeable membrane which is used for the desalination process should be relatively thin in nature in order to provide a desirable flux rate, it is necessary, in many instances, that the reverse osmosis membrane be composited or laminated on a porous backing support material. This porous support backing material should in itself possess certain characteristics which make it desirable for such a use. For example, the porous support material should possess pore sizes which are sufficiently large enough so that the water or permeate can pass through the support without affecting or lessening the flux rate of the entire composite. Conversely speaking, the pore size should not be large enough so that the thin composite semipermeable membrane will tend to fill up or enter into the pores, thus distorting the shape of the thin film membrane with the attendant possibility of rupturing the membrane, thus causing said membrane to lose its effectiveness in the reverse osmosis process.

In addition to the aforementioned U.S. patents, another U.S. Pat. No. 4,277,344, discloses an interfacial synthesized reverse osmosis membrane. This membrane is prepared from a cross-linked interfacially polymerized aromatic polyamine which has been prepared from an essentially monomeric polyacyl halide and an essentially monomeric arylene polyamine.

We have now discovered that semipermeable membranes which possess the desirable characteristics of high salt rejection and good flux may be prepared in an interfacial polymerization reaction utilizing an aromatic polycarboxylic acid chloride and a hydrazine compound as the reactive components.

SUMMARY OF THE INVENTION

This invention relates to reverse osmosis membranes and to a process for the preparation thereof. More specifically, the invention is concerned with reverse osmosis membranes which exhibit good separation as well as a high flux rate.

As was previously discussed, the use of reverse osmosis membranes for the separation of liquids from liquids or solids from liquids are important articles of commerce. This is especially true in the area of desalination whereby water which is brackish or saline in nature may be rendered potable or suitable for use in other industrial or agricultural regions by passing the water through reverse osmosis membranes. The particular membranes which constitute the inventive feature of the present application will comprise the reaction product resulting from the reaction of a hydrazine compound and an aromatic polycarboxylic acid chloride, said membrane being composited or coated on a porous support backing material. By utilizing these membranes in a desalination process, it is possible to treat a saline or brackish water source over a relatively long period of time without replacement of the membrane. In addition to the use of these membranes in desalination processes, it is also contemplated that the membranes may be used in other separation processes such as, for example, the separation of sugars as exemplified by the separation of glucose or fructose from polysaccharides which possess a degree of polymerization greater than 2.

It is therefore an object of this invention to provide a reverse osmosis membrane, suitable for use in separation processes, which possesses desirable characteristics.

A further object of this invention is to provide a process for preparing a reverse osmosis membrane which possesses desirable characteristics such as a high flux rate as well as good separation.

In one aspect an embodiment of this invention resides in a semipermeable membrane composition comprising a porous support backing material having composited thereon an interfacial polymerized condensation reaction product resulting from the reaction of a hydrazine compound and an aromatic polycarboxylic acid chloride.

Another object of this invention resides in a process for the preparation of a semipermeable membrane composition which comprises contacting a porous support backing material with an aqueous solution of a hydrazine compound, removing excess solution, contacting the coated support material with an organic solution of an aromatic polycarboxylic acid chloride to form an interfacial polymerized condensation reaction product on the surface of said support backing material, removing excess solution, curing the resultant composite at curing conditions, and recovering the resultant semipermeable membrane composition.

A specific embodiment of this invention is found in a semipermeable membrane composition comprising polysulfone having supported thereon the interfacial polymerized condensation product resulting from the reaction of hydrazine with trimesoyl chloride.

Another specific embodiment of this invention is found in a process for the preparation of a semipermeable membrane composition which comprises contacting a porous backing support material comprising polysulfone with an aqueous solution of hydrazine, removing excess solution, contacting said coated polysulfone with a hexane solution of trimesoyl chloride to form an interfacial polymerized condensation reaction product membrane on the surface of said polysulfone, removing excess solution, curing the resultant composite at a temperature in the range of from about 25° to about 150° C. for a period of time in the range of from about 1 minute to about 2 hours, and recovering the resultant semipermeable membrane composition.

Other objects and embodiments will be found in the following detailed description of the invention.

DETAILED DESCRIPTION OF THE INVENTION

As hereinbefore set forth, the present invention is concerned with semipermeable membranes which may be utilized in various separation processes. The membranes are prepared by contacting a porous backing support material with an aqueous solution of a hydrazine compound and removing the excess solution. Thereafter, the coated support material is contacted with an organic solvent solution of an aromatic polycarboxylic acid chloride, said organic solvent being immiscible with the aqueous solution, whereby an interfacial polymerized condensation reaction product is formed on the surface of the support material. The resulting composite is then cured at conditions hereinafter set forth in greater detail to provide a semipermeable membrane which exhibits favorable characteristics with respect to salt rejection as well as flux rate.

As was hereinbefore set forth, one component of the interfacial polymerized condensation product will comprise either a di- or tricarboxylic acid chloride such as isophthaloyl chloride, terephthaloyl chloride, trimesoyl chloride (1,3,5-benzenetricarboxylic acid chloride) as well as mixtures of trimesoyl chloride and the isomeric phthaloyl chlorides.

The other component of the reaction will comprise a hydrazine compound which possesses the generic formula

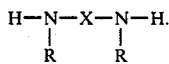

where X may be nil (i.e., a nitrogen-nitrogen bond) or

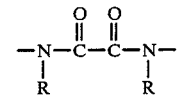

in which R is independently selected from the group consisting of hydrogen, alkyl radicals containing from 1 to about 10 carbon atoms, aralkyl, alkaryl, and cycloalkyl radicals. Some specific examples of these hydrazine compounds will include hydrazine, oxalyl dihydrazide, N-methyl hydrazine, N-ethylhydrazine, N-propylhydrazine, N-isopropylhydrazine, N-butylhydrazine, N-sec-butylhydrazine, N-pentylhydrazine, the isomeric N-hexyl-, N-heptyl-, N-octyl-, N-nonyl-, and N-decylhydrazines, N-phenylhydrazine, N-o-tolylhydrazine, N-m-tolylhydrazine, N-p-tolylhydrazine, N-benzylhydrazine, N-2-phenylethylhydrazine, N-3-phenylpropylhydrazine, N-cyclopentylhydrazine, N-cyclohexylhydrazine, N,N'-dimethylhydrazine, N,N'-diethylhydrazine, N,N'-dipropylhydrazine, N,N'-diisopropylhydrazine, N,N'-dibutylhydrazine, N,N'-dipentylhydrazine, N,N'-diphenylhydrazine, N,N'-di-o-tolylhydrazine, N,N'-di-m-tolylhydrazine, N,N'-di-p-tolylhydrazine, N,N'-dibenzylhydrazine, N,N'-di-(2-phenylethyl)hydrazine, N,N'-di-(3-phenylpropyl)hydrazine, N,N'-dicyclohexylhydrazine, etc.

It is to be understood that the aforementioned hydrazine compounds are only representative of the class which may be employed to form the interfacial polymerized reaction products with the aforementioned aromatic polycarboxylic acid chlorides, and that the present invention is not necessarily limited thereto.

In one embodiment, the semipermeable membranes of the present invention may be prepared by coating the porous support backing material with an aqueous solution of the hydrazine compound. As was previously set forth, the porous support backing material comprises a polymeric material containing pore sizes which are sufficient to permit the passage of permeate therethrough but are not large enough so as to interfere with the bridging over of the resulting ultra-thin reverse osmosis membrane. In the preferred embodiment of the invention the pore sizes of the porous support backing material will range from about 1 to about 1000 millimicrons inasmuch as pores which are larger than 1000 millimicrons will permit the ultra-thin reverse osmosis membrane to sag into the pore, thus disrupting the flat sheet configuration which is a desirable characteristic of the membrane. Examples of porous support backing material which may be used to prepare the desired membrane composite will include such polymers as polysulfone, polycarbonate, microporous polypropylene, the various polyamides, polyphenylene oxide, polyphenylene ether sulfone, etc.

The porous support backing material is coated with an aqueous solution of the hydrazine compound utilizing either a hand casting or continuous operation. The solution which is utilized as the carrier for the hydrazine compound will be 100% water or 100% acetonitrile or intermediate mixtures of water and acetonitrile. In the preferred embodiment of the invention, the hydrazine compound will be present in the solution in an amount in the range of from about 0.1 to about 5% by weight of the solution. In addition, it is also contemplated within the scope of this invention that the solution may also contain additional components, which, while not entering into the reaction, provide additional assistance in formulating the desired interfacial polymerization reaction product. Examples of these additives which may be present will include surfactants including ionic surfactants such as sodium lauryl sulfate, lower molecular weight alcohols such as methanol, ethanol, the isomeric propanols, butanols, or nonionic surfactants such as polyethylene glycol, polypropylene glycol, copolymers of ethylene glycol and propylene glycol, etc. In addition, the aqueous solution may also contain basic acid scavengers such as sodium hydroxide, potassium hydroxide, sodium carbonate, potassium carbonate, etc.

After coating the porous support backing material with the solution of the hydrazine compound, the excess solution is drained and the coated support material is then contacted with an organic solvent solution of the aromatic polycarboxylic acid chlorides. Again, in the preferred embodiment of the invention, the aromatic polycarboxylic acid chlorides are present in the organic solvent solution in a range of from about 0.1 to about ·5% by weight of the solution. The organic solvents which are employed in the process of this invention will comprise paraffins such as n-pentane, n-hexane, n-heptane, cyclopentane, cyclohexane, methylcyclopentane, etc. or a halogenated solvent such as trichlorotrifluoroethane.

Inasmuch as the organic solvent and the solvent for the hydrazine compound are substantially immiscible or incompatible, the polymerization of the two components of the membrane will occur substantially only at the interface between the solvent phases and thus an interfacially polymerized reaction product comprising a thin film membrane will be formed thereat. The contact time required for the formation of the thin film membrane will fluctuate over a relatively wide range of from about 1 second to about 60 seconds. Following the formation of the interfacially polymerized reaction product on the surface of the porous support backing material, the resultant composite may be cured to remove any remaining solvent and firmly affix the thin film membrane on the surface of the support. The curing of the composite membrane may be effected over a wide temperature range, said temperature being from ambient (20°–25° C.) up to about 150° C. for a period of time ranging from about 1 minute to about 2 hours or more in duration. The operating parameters of time and temperature will be interdependent, the primary criteria for the curing of the membrane being that said curing time is sufficient to provide the desired membrane but being insufficient to affect the desired characteristics of the thin film membrane and the porous backing support material. For example, excessive heat or curing time may affect the pore size of the backing material, thus resulting in a decrease of the desired flux rate of the membrane.

It is also contemplated within the scope of this invention that the semipermeable membrane may be prepared in a continuous manner of operation. When this type of operation is employed, a porous support backing material of the type hereinbefore set forth in greater detail is continuously passed through a bath of a solution of the hydrazine compound, said solution also containing, if so desired, a surfactant and an acid scavenger. After passage through the bath, the backing material is continuously withdrawn and, if so desired, passed between rollers in order to remove any excess solution which may be present. The coated support material is then also continuously passed through the solution of the aromatic polycarboxylic acid chloride in an organic solvent. The interfacial polymerization reaction will occur during the contact time between the solutions following which the composite comprising the interfacial polymerized reaction product in the form of a thin film semipermeable membrane on the porous support backing material will then be cured as, for example, by passage through an oven which is maintained at a desired curing temperature, the passage through said oven being at a predetermined rate so as to avoid any possible damage to the composite membrane.

The resultant semipermeable membrane may then be employed for the separation process desired such as the desalination of sea water or brackish water, other treatments of water such as softening of hard water whereby salts are removed, separation of sugars, concentration of whey, etc. The membranes which are in the form of flat sheets are particularly applicable for use in modules either in single sheet or multiple sheet units whereby the sheet or sheets are wound in a spiral type configuration.

The following examples are given for purposes of illustrating the novel semipermeable membranes and to their use thereof as separation agents. However, it is to be understood that these examples are provided merely for purposes of illustration and that the present invention is not necessarily limited thereto.

EXAMPLE I

A semipermeable membrane was prepared by continuously passing a sheet of polysulfone through a solution comprising 0.8% by weight of hydrazine in a solvent comprising water. The rate of passage of the polysulfone sheet through the bath was effected at a rate of 0.33 ft/min at atmospheric pressure and ambient temperature, the contact of the polysulfone with the aqueous solution lasting for a period of 20 seconds. The excess solution was drained and the coated polysulfone support was then continuously passed through an organic solution comprising 1.0% by weight of trimesoyl chloride in hexane. After again allowing a contact time of 20 seconds to elapse, the excess solution was drained and the membrane composite was cured at a temperature of 70° C. for a period of 30 minutes.

A sample of this membrane in a size of 1"×3" was placed in a cell and a synthetic sea-water feed containing 5,000 ppm of sodium chloride was passed across the surface of the membrane at a feed flow rate of 1.3 gal/min (GPM). The test conditions which were employed during this experiment included a pressure of 800 pounds per square inch (psi) on one side of the membrane while the other side of the membrane was maintained at atmospheric pressure. In addition, a temperature of 25° C. was maintained throughout the test while keeping the pH of the feed at 5.5. The permeate which was collected from the flowthrough was measured and it was found that there had been a 98.0%. sodium chloride rejection at a flux rate of 10.4 GFD.

EXAMPLE II

In this example, a membrane was prepared by continuously passing a sheet of polysulfone through a bath of 0.8% by weight of hydrazine dissolved in water. The rate of passage of the polysulfone sheet through the bath was effected at a rate of 0.33 ft/min at atmospheric pressure and ambient temperature, the contact of the polysulfone sheet with the solution lasting for a period of 20 seconds. The sheet of coated polysulfone was continuously withdrawn from the bath and the aqueous solution was drained therefrom. Thereafter, the sheet was continuously passed through a bath of hexane which contained 0.75% by weight of trimesoyl chloride and 0.25% by weight of isophthaloyl chloride. Again, the contact of the polysulfone sheet with the organic solution lasted for a period of 20 seconds. After excess solution was removed, the composite was subjected to a curing step in an oven at a temperature of 70° C. for a period of 30 minutes.

A 1"×3" sample of the membrane was then placed in a cell and a feedstock similar in nature to that described in Example I above was passed over the surface of the membrane under conditions also similar to that described in the above example. The permeate was analyzed and it was found that there had been a 97.8% rejection of sodium chloride at a flux rate of 12.2 GFD.

EXAMPLE III

In this example, another membrane was prepared by passing a polysulfone sheet through an aqueous bath comprising 0.8% by weight of hydrazine dissolved in water. The contact of the polysulfone sheet with the aqueous solution was effected at ambient temperature and pressure for a contact time of 20 seconds. The sheet of coated polysulfone was continuously withdrawn from the bath and the excess aqueous solution was drained therefrom. Following this, the sheet was continuously passed through a bath of hexane which contained 0.15% by weight of trimesoyl chloride and 0.85% by weight of isophthaloyl chloride. The contact of the coated polysulfone sheet with the organic solution lasted for a similar period of time, that is, 20 seconds following which the excess solution was drained and the composite subjected to a curing step in an oven at 70° C. for a period of 30 minutes.

As in the preceding examples, a 1"×3" sample of the membrane was placed in a cell and a feedstock comprising a synthetic sea-water feed which contained 5,000 ppm of sodium chloride was passed over the surface of the membrane at a temperature of 25° C., a pH of 5.5 and a pressure of 800 psi. The permeate which was recovered from the flowthrough was analyzed and it was found there had been a 98.0% rejection of the sodium chloride at a flux rate of 10.3 GFD.

Similar membranes which were prepared by utilizing varying amounts of hydrazine and trimesoyl chloride or mixtures of trimesoyl chloride and isophthaloyl chloride in which the aqueous solution contained from 1.0 to 2.0 wt. % of hydrazine and the hexane solution contained from 1.0 to 2.0% by weight of acid chlorides resulted in membranes which, when tested, gave results ranging from 90 to 97% sodium chloride rejection and flux rates ranging from 2.7 to 14.1 GFD.

EXAMPLE IV

In this example, a membrane was prepared by continuously passing a polysulfone sheet through a solution comprising 0.25% by weight of oxalyl dihydrazide dissolved in water. The rate of passage of the polysulfone sheet through the bath was effected at a rate of 0.33 ft/min at ambient pressure and temperature. The contact of the polysulfone sheet with the solution lasted for a period of 20 seconds. The sheet of coated polysulfone was 5 continuously withdrawn from the solution and the excess aqueous solution was allowed to drain therefrom. Thereafter, the sheet was continuously passed through a bath of hexane which contained 0.5% by weight of trimesoyl chloride. Again, the contact of the polysulfone sheet with the organic solution lasted for a period of 20 seconds. After excess solution was removed, the composite was subjected to a curing step in an oven at a temperature of 70° C. for a period of 30 minutes.

A 1"×3" sample of the membrane was then placed in a cell and a feedstock similar in nature to that described in Example I above was passed over the surface of the membrane under conditions also similar to those described in the above example. The permeate was analyzed and it was found that there had been a 69.8% rejection of sodium chloride at a permeate flux rate of 22.3 GFD.

EXAMPLE V

In this example, a membrane was prepared by continuously passing a sheet of polysulfone through a bath comprising 1.75% by weight of hydrazine and 0.25% by weight of oxalyl dihydrazide dissolved in water. The rate of passage of the polysulfone sheet through the bath was effected at a rate of 0.33 ft/min at ambient temperature and pressure, and contact time was again 20 seconds. The sheet of coated polysulfone was continuously withdrawn from the bath, and excess aqueous solution was allowed to drain therefrom. Following this, the coated sheet of polysulfone was continuously passed through a bath comprising 0.5% by weight of trimesoyl chloride and 0.5% by weight of isophthaloyl chloride dissolved in hexane. Contact time of the coated polysulfone sheet with the organic solution was again 20 seconds, following which the excess organic solution was allowed to drain off and the composite was subjected to a curing step in an oven at 70° C. for a period of 30 minutes.

As in the preceding examples, a 1"×3" sample of the membrane was placed in a cell and a feedstock comprising a synthetic sea-water feed which contained 5,000 ppm of sodium chloride was passed over the surface of the membrane at a temperature of 250C, a pH of 5.5, and a pressure of 800 psi. The permeate was analyzed and it was found that there had been a 92.8% rejection of sodium chloride at a permeate flux rate of 13.4 GFD.

EXAMPLE VI

In a manner similar to that set forth in the above examples, other semipermeable membranes may be prepared by contacting a porous support backing material such as polysulfone, polycarbonate or polyphenyl ether with an aqueous solution of a hydrazine compound, such as N-methylhydrazine, N,N'-diethylhydrazine, N-phenylhydrazine, N,N'-dicyclohexylhydrazine, etc. at ambient temperatures and pressures. After draining the excess aqueous solution, the coated porous support backing material is then contacted with an organic solution of an aromatic polycarboxylic acid chloride or a mixture of acid chlorides such as trimesoyl chloride, isophthaloyl chloride or terephthaloyl chloride, having a similar period of time to form an interfacial polymerized condensation reaction product on the surface of the support. After draining the excess organic solution the composite is then cured at an elevated temperature ranging from about 25° to about 150° C. to prepare a semipermeable membrane.

The thus prepared membranes may be used to effect the separation of various liquid components such as monosaccharide from polysaccharide or may be used in a desalination process.

We claim as our invention:

1. A semipermeable membrane composition comprising a porous support backing material having composited thereon an interfacial polymerized condensation reaction product resulting from the reaction of a hydrazine compound and an aromatic polycarboxylic acid chloride, said hydrazine compound being defined by the formula

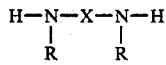

where X may be a bond between the nitrogen atoms or defined by the formula

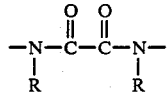

where R is selected from the group consisting of hydrogen, alkyl radicals having from 1 to 10 carbon atoms, aralkyl, alkaryl and cycloalkyl radicals.

2. The semipermeable membrane composition as set forth in claim 1 in which said hydrazine compound and said aromatic polycarboxylic acid chloride are present in a weight ratio in the range of from about 0.1:1 to about 40:1 wt. % of hydrazine compound per wt. % of aromatic polycarboxylic acid chloride.

3. The semipermeable membrane composition as set forth in claim 1 in which said aromatic polycarboxylic acid chloride is selected from the group consisting of isophthaloyl chloride, terephthaloyl chloride, trimesoyl chloride and mixtures thereof.

4. The semipermeable membrane composition as set forth in claim 1 in which said hyrazine compound is hydrazine.

5. The semipermeable membrane composition as set forth in claim 1 in which said hydrazine compound is N-methylhydrazine.

6. The semipermeable membrane composition as set forth in claim 1 in which said hydrazine compound is N,N'-diethylhydrazine.

7. The semipermeable membrane composition as set forth in claim 1 in which said hydrazine compound is N-phenylhydrazine.

8. The semipermeable membrane composition as set forth in claim 1 in which said hydrazine compound is N,N'dicyclohexylhydrazine.

9. The semipermeable membrane composition as set forth in claim 1 in which said hydrazine compound is oxalyl dihydrazide.

10. The semipermeable membrane composition as set forth in claim 1 in which said porous support backing material comprises polysulfone.

11. The semipermeable membrane composition as set forth in claim 1 in which said porous support backing material comprises polycarbonate.

12. The semipermeable membrane composition as set forth in claim 1 in which said porous support backing material comprises polyphenylene oxide.

13. The semipermeable membrane composition as set forth in claim 1 in which said aromatic polycarboxylic acid chloride is trimesoyl chloride, said hydrazine compound is hydrazine and said porous support backing material is polysulfone.

14. The semipermeable membrane composition as set forth in claim 1 in which said aromatic polycarboxylic acid chloride is a mixture of trimesoyl chloride and isophthaloyl chloride, said hydrazine compound is hydrazine and said porous support backing material is polysulfone.

15. The semipermeable membrane composition as set forth in claim 1 in which said aromatic polycarboxylic acid chloride is trimesoyl chloride, said hydrazine compound is N-methylhydrazine, and said porous support backing material is polysulfone.

16. The semipermeable membrane composition as set forth in claim 1 in which said aromatic polycarboxylic acid chloride is isophthaloyl chloride, said hydrazine compound is N,N'-diethylhydrazine, and said porous support backing material is polycarbonate.

17. The semipermeable membrane composition as set forth in claim 1 in which said aromatic polycarboxylic acid chloride is a mixture of trimesoyl chloride and terephthaloyl chloride, said hydrazine is N-phenylhydrazine, and said porous support backing material is polyphenylene oxide.

18. The semipermeable membrane composition as set forth in claim 1 in which said aromatic polycarboxylic acid chloride is a mixture of trimesoyl chloride and isophthaloyl chloride, said hydrazine compound is a mixture of hydrazine and oxalyl dihydrazide, and said porous support backing material is polysulfone.

19. A process for the preparation of a semipermeable membrane composition which comprises contacting a porous support backing material with an aqueous solution of a hydrazine compound, removing excess solution, contacting the coated support material with an organic solution of an aromatic polycarboxylic acid chloride to form an interfacial polymerized condensation reaction product on the surface of said support backing material, removing excess solution, curing the resultant composite at curing conditions, and recovering the resultant semipermeable membrane composition, said hydrazine compound being defined by the formula

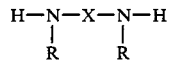

where X may be a bond between the nitrogen atoms or defined by the formula

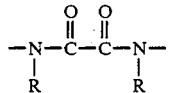

where R is selected from the group consisting of hydrogen, alkyl radicals having from 1 to 10 carbon atoms, aralkyl, alkaryl and cycloalkyl radicals.

20. The process as set forth in claim 19 in which said curing conditions include a temperature in the range of from about 25° to about 150° C. for a period of time in the range of from about 1 minute to about 2 hours.

21. The process as set forth in claim 19 in which said aqueous solution of said hydrazine compound may include an ionic or nonionic surfactant.

22. The process as set forth in claim 21 in which said aqueous solution may contact an organic solvent which is immiscible with water.

23. The process as set forth in claim 19 in which said aromatic polycarboxylic acid chloride is trimesoyl chloride, said hydrazine compound is hydrazine and said porous support backing material is polysulfone.

24. The process as set forth in claim 19 in which said aromatic polycarboxylic acid chloride is isophthaloyl chloride, said hydrazine compound is hydrazine and said porous support backing material is polysulfone.

25. The process as set forth in claim 19 in which said aromatic polycarboxylic acid chloride is trimesoyl chloride, said hydrazine compound is N-methylhydrazine, and said porous support backing material is polysulfone.

26. The process as set forth in claim 19 in which said aromatic polycarboxylic acid chloride is trimesoyl chloride, said hydrazine compound is oxalyl dihydrazide and said porous support backing material is polysulfone.

27. The process as set forth in claim 19 in which said aromatic polycarboxylic acid chloride is a mixture of trimesoyl chloride and terephthaloyl chloride, said hydrazine is N-phenylhydrazine, and said porous support backing material is polyphenylene oxide.

* * * * *

UNITED STATES PATENT AND TRADEMARK OFFICE
CERTIFICATE OF CORRECTION

PATENT NO.   :   4,919,808
DATED        :   Apr. 24, 1990
INVENTOR(S)  :   Swedo et al.

It is certified that error appears in the above-identified patent and that said Letters Patent is hereby corrected as shown below:

Column 7, line 65: delete "5"
Column 8, line 40: "250C" should read --25°C--
Column 9, line 36: "hyrazine" should read --hydrazine--

Signed and Sealed this

Third Day of August, 1993

Attest:

MICHAEL K. KIRK

Attesting Officer          Acting Commissioner of Patents and Trademarks